United States Patent

[11] 3,549,141

| | | |
|---|---|---|
| [72] | Inventors | Theodor Zimmermann;<br>Alois Ullrich, Siegen, Westphalia, Germany |
| [21] | Appl. No. | 757,962 |
| [22] | Filed | Sept. 6, 1968 |
| [45] | Patented | Dec. 22, 1970 |
| [73] | Assignee | Dango & Dienenthal Kommanditgesell-Schaft, Siegen, Westphalia, Germany |
| [32] | Priority | Sept. 11, 1967 |
| [33] | | Germany |
| [31] | | 1,583,166 |

[54] APPARATUS FOR OPENING AND CLOSING THE TAP HOLES OF SHAFT FURNACES
5 Claims, 7 Drawing Figs.

[52] U.S. Cl. .................................................. 266/42
[51] Int. Cl. .................................................. C21b 7/12
[50] Field of Search........................................... 266/1, 42, (Inquired); 264/30; 18/(Patching Digest)

[56] References Cited
UNITED STATES PATENTS

| | | | |
|---|---|---|---|
| 2,228,255 | 1/1941 | Brosius........................ | 266/42 |
| 3,121,769 | 2/1964 | Horn........................... | 266/42 |
| 3,303,745 | 2/1967 | Moll et al..................... | 90/11 |

Primary Examiner—Gerald A. Dost
Attorneys—Curt M. Avery, Arthur E. Wilfond, Herbert L. Lerner and Daniel J. Tick ABSTRACT: In accordance with the invention a tap hole gun and a tap hole drill are mounted side by side facing in opposite directions on an upright pivot extending between them. Without moving the pivotal axis the gun and drill can in turn be swung around to working positions in front of a furnace tap hole.

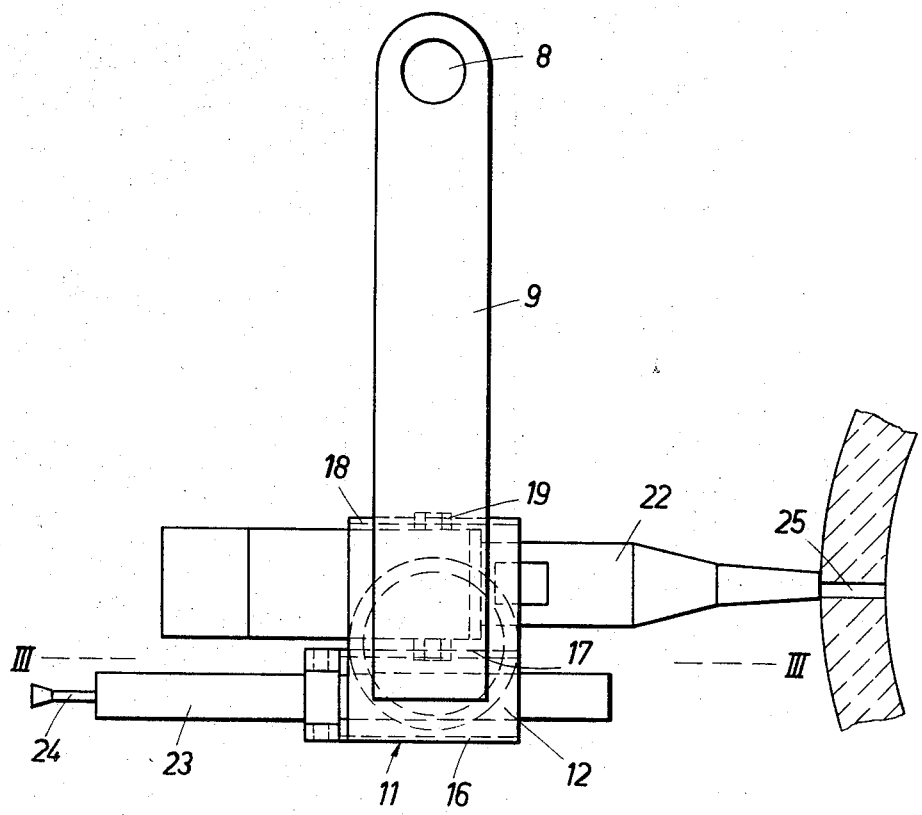
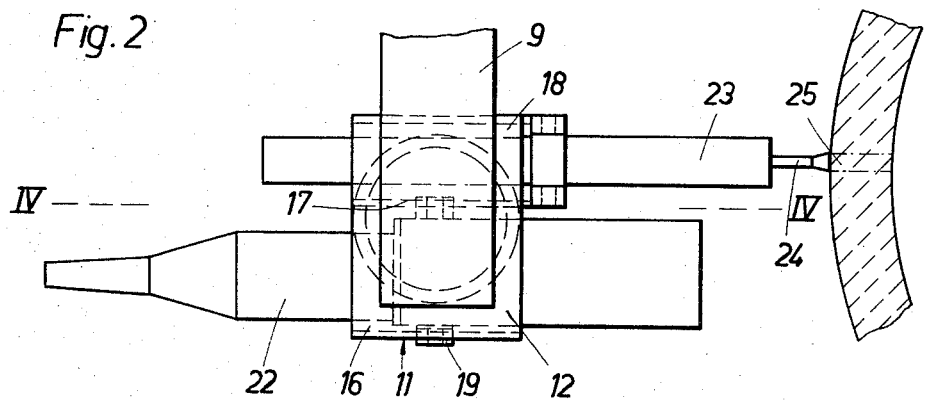

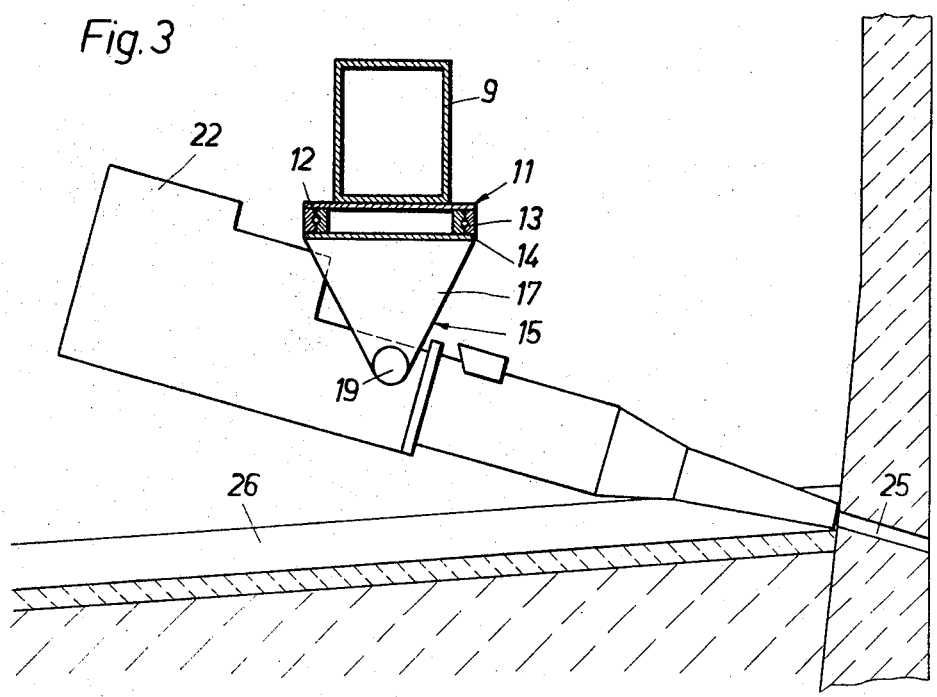
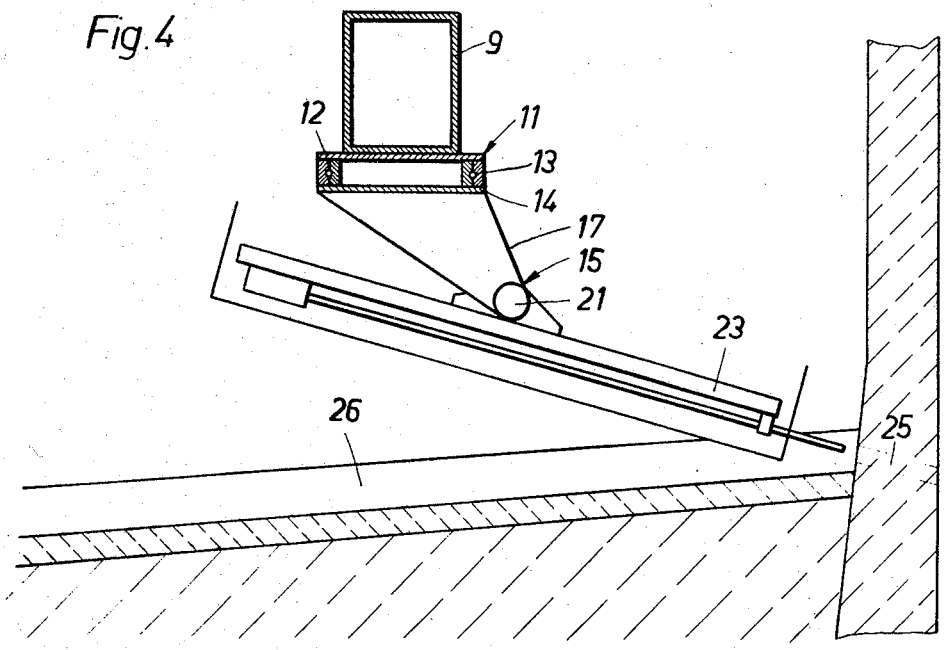

APPARATUS FOR OPENING AND CLOSING THE TAP HOLES OF SHAFT FURNACES

The invention relates to a device for opening and closing the tap holes of shaft furnaces, particularly blast furnaces. For this purpose devices are known which consist of a tap hole gun (for plugging a tap hole) and a tap hole drill (for drilling a tap hole) mounted on a boom pivotable about a horizontal pivot axis. For example in the German Pat. specification No. 1,162,856 a tap hole gun is described which is mounted on a boom capable of pivoting about a column, so that the gun can be pivoted in two planes. The tap hole gun itself is mounted to pivot in a fork which is mounted on a shaft which is itself rotatable on the horizontal boom. The tap hole gun is swung by a drive mounted on the boom, the drive having a pinion which engages with a toothed ring mounted on the free end of the supporting column. It is also known to mount on the free end of a boom, which is pivoted on a supporting column, tap hole drill equipped with a drill bit for opening a tap hole in a furnace.

In view of the fact that in modern furnaces the tap hole can neither be opened nor closed by hand, two machines have to be available for performing the necessary operations, a tap hole gun and a tap hole drill. This makes it necessary to install for example two supporting columns, one on each side of the iron runner, each column equipped with a swinging boom. The tap hole gun is mounted on the one boom and the tap hole drill on the other. To open the tap hole the drill is swung into its operating position in the vertical plane of the notch, or of the iron runner, the gun remaining in its position of rest, that is to say swung away through 180° from the plane of the tap hole. When the tap hole has been opened, the drill is swung away through 180° into its position of rest, and the gun is swung through 180° into its operating position in the plane of the tap hole. As soon as the tap hole has been closed the gun is swung away again.

This arrangement, using two supporting columns one on each side of the iron runner, one for the gun and the other for the drill, takes up valuable space and greatly interferes with the furnace manipulation, particularly in the cleaning and tamping of the iron and slag runners. This interference with manipulation of the furnace is a serious problem because a modern blast furnace usually has two or more tap holes and consequently there are at least four supporting columns, each supporting a machine, arranged around the hearth of the blast furnace. Furthermore, the sweep of each machine is comparatively great, with the result that a considerable part of the furnace platform becomes inaccessible during the periods when one or more of the machines are in operation.

The object of the present invention is to remove these disadvantages, which result from the requirement that there must be a tap hole gun and a tap hole drill for each tap hole of a furnace, and in particular to provide a device for opening and closing the tap hole, which occupies considerably less space than the customary devices in the immediate neighbourhood of the furnace tap hole.

To achieve this object in accordance with the invention we mount apparatus comprising a tap hole gun and a tap hole drill side by side parallel to one another but facing in opposite directions on a common upright pivot extending symmetrically between them.

The two machines arranged in this way use up very much less space, because only one supporting structure is used for supporting both the machines. The pivot can be mounted on a boom capable of swinging about a supporting column. The single boom allows both the machines to be swung around together from their position of rest into position in front of the furnace tap hole. This brings one of the two machines into its operating position, that is to say in the vertical plane of the tap hole. By rotating the pivot, which supports the assembly of two machines, through 180°, the second machine is subsequently brought into its operating position in the vertical plane of the tap hole.

In another arrangement which is useful in regard to the saving of space, the pivot supporting the assembly of two machines is attached to a traveling carriage running on rails. The rails can extend overhead at a high level, so that the assembly of machines can be driven to a position of rest far away from the tap hole of the furnace, leaving the area around the furnace hearth free of obstructions, so that work can proceed unimpeded on the iron and slag runners.

The pivot preferably consists of an upper plate and a lower plate with a ball bearing between them. The two machines can be suspended from the pivot bearing by means of a fork attached to the lower plate, the machines being mounted between the arms of the fork on horizontal pivot studs.

Two examples of apparatus constructed in accordance with the invention are illustrated in the accompanying drawings, in which:

FIG. 1 is a plan of the first example, showing the gun in its working position;

FIG. 2 is a similar plan, but showing the tap hole drill in its working position;

FIG. 3 is a section taken along the line III–III in FIG. 1;

FIG. 4 is a section taken along the line IV–IV in FIG. 2;

Figure 7:
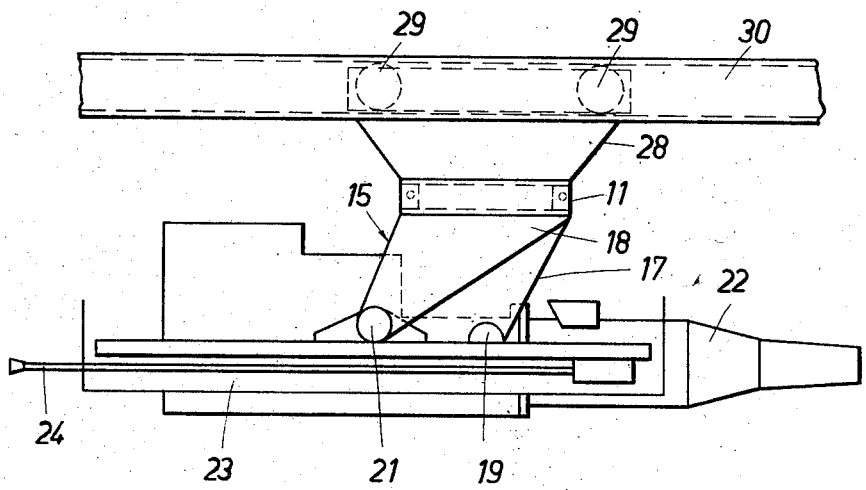
FIG. 7 is a side view of a part of the FIG. 5 example.

The apparatus shown in FIGS. 1 to 4 consists of a vertical supporting column 8, to the head of which there is pivoted a horizontal swinging boom 9. To the free end of the boom 9 there is attached a pivot bearing 11, consisting of an upper plate 12, fixed to the boom 9, and a rotary lower plate 14, which rotates relative to the other plate 12 on a ball bearing 13. To the lower plate 14 there is attached a fork 15, between the arms 16, 17, of which there are pivotally mounted on pivot studs 19, 21 a tap hole gun 22 and a tap hole drill 23, both of the usual kind. FIG. 1 shows the notch gun 22 positioned in the vertical plane of the tap hole 25 and of the iron runner 26, whereas the tap hole drill is positioned in a parallel plane, the drill bit 24 facing away from the tap hole. By rotating the assembly, which is attached to the lower plate 14 of the pivot bearing 11, through 180° without moving the axis of the bearing the tap hole drill 23 is brought around from the position shown in FIG. 1 into its working position, as shown in FIGS. 2 and 4. On the other hand, during the periods when neither of the two machines are required for operating on the tap hole, the entire assembly is simply swung away through 180° about the pivot head 8 of the supporting column.

Figure 6:
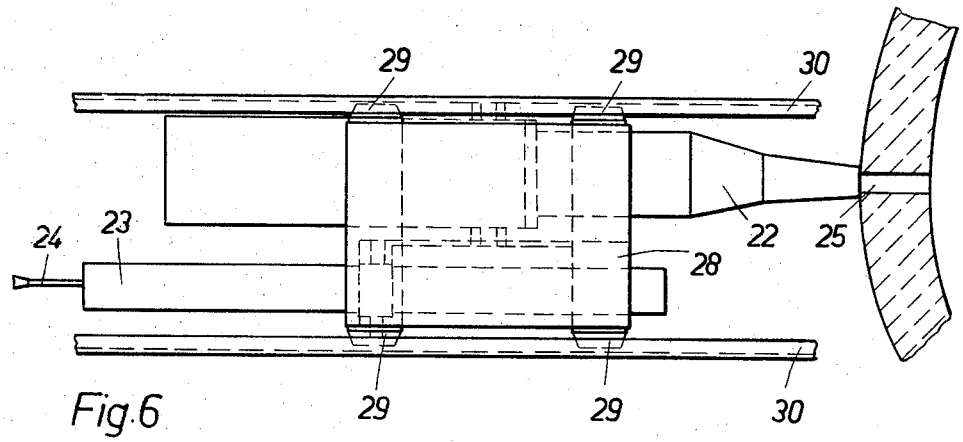
FIG. 6 is a plan to a larger scale of the second example of apparatus shown suspended from an overhead carriage.
Figure 5:
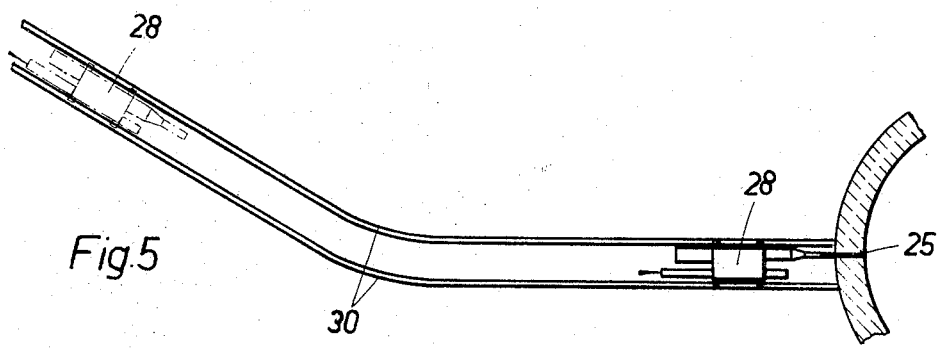
FIG. 5 is a plan of the second example.

In the example represented in FIGS. 5 to 7 the pivot bearing 11 is attached to the lower part of an overhead carriage 28 having wheels 29 which roll on rails 30 extending above the level of the furnace platform. The other parts of the assembly are arranged as represented in FIGS. 1 to 4. However the use of a travelling carriage has the special advantage that after operations on the furnace tap hole have been completed the assembly 22, 23 can be driven away from the furnace to a remote location, as represented in FIG. 5. If the rails 30 are positioned high enough the machine, after it has been driven away from the furnace, no longer in any way interferes with access to the furnace hearth, the iron runner and the slag runner.

It should be observed that the use of a traveling carriage, as shown in FIGS. 5 to 7, would certainly allow the rails to be arranged in such a way that a single assembly 22, 23 could be used for working on both the tap holes of a single blast furnace, or alternatively be used for working on two neighbouring tap holes belonging to two different blast furnaces. An arrangement of this kind not only saves space but also reduces the total cost of equipment. Furthermore, even in those cases where each tap hole has its own apparatus 22, 23, if the rails are suitably arranged the important advantage is obtained that when one apparatus becomes unserviceable for one reason or another, another assembly can be driven around, either from the other tap hole of the furnace or from a different furnace, and used temporarily until the faulty machine has been repaired.

We claim:

1. Apparatus for opening and closing the tap holes of shaft furnaces, the apparatus comprising a tap hole gun, a tap hole drill, means mounting said gun and said drill side by side parallel to one another but facing in opposite directions, said mounting means including a common upright pivot extending symmetrically between said gun and said drill.

2. Apparatus according to claim 1, further comprising a column, a horizontal boom, means mounting said boom on said column for swinging movement thereabout, and means mounting said common pivot on said horizontal boom.

3. Apparatus according to claim 1, comprising rails, a traveling carriage adapted to run on said rails, and means mounting said common pivot on said traveling carriage.

4. Apparatus according to claim 1, wherein said common pivot comprises an upper plate, a lower plate, and a ball bearing interposed between said upper and lower plates.

5. Apparatus according to claim 4, further comprising a fork carried by said lower plate, horizontal pivot studs mounted between arms of said fork, and means locating said gun and said drill on said pivot studs.